United States Patent
Ballard et al.

(10) Patent No.: US 6,774,602 B2
(45) Date of Patent: Aug. 10, 2004

(54) APPARATUS AND METHOD FOR PROVIDING TEMPORARY POWER

(75) Inventors: Gary L. Ballard, Carmel, IN (US); Dell Albert Crouch, Jr., Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/172,091

(22) Filed: Jun. 14, 2002

(65) Prior Publication Data

US 2003/0231003 A1 Dec. 18, 2003

(51) Int. Cl.[7] .................................................. H02J 7/00
(52) U.S. Cl. ...................................... 320/103; 320/112
(58) Field of Search ................................ 320/103, 112, 320/120, 121, 122, 126, 127, 132, 137, 152, 101; 307/46, 66

(56) References Cited

U.S. PATENT DOCUMENTS

| | | | |
|---|---|---|---|
| 5,670,266 A | 9/1997 | Thomas et al. | 429/3 |
| 5,916,699 A | 6/1999 | Thomas et al. | 429/3 |
| 6,061,577 A * | 5/2000 | Andrieu et al. | 455/572 |
| 6,204,633 B1 * | 3/2001 | Kitagawa | 320/128 |
| 6,297,620 B1 * | 10/2001 | Goodrich, II | 320/152 |
| 6,307,347 B1 | 10/2001 | Ronning | 320/107 |
| 6,307,349 B1 * | 10/2001 | Koenck et al. | 320/112 |
| 6,369,461 B1 * | 4/2002 | Jungreis et al. | 307/46 |
| 6,538,414 B1 * | 3/2003 | Tsuruga et al. | 320/119 |
| 6,577,099 B2 | 6/2003 | Kruger et al. | 320/104 |
| 6,609,582 B1 | 8/2003 | Botti et al. | 180/65.3 |

* cited by examiner

Primary Examiner—Lawrence Luk
(74) Attorney, Agent, or Firm—Jimmy L. Funke

(57) ABSTRACT

A backup power supply, comprising: a storage medium for holding an electrical charge and being configured to be connected and disconnected from an electrical device; a source of intermittent power coupled to a power supply and the electrical device being configured to provide an amount of power to the electrical device for a period of time long enough to connect the storage medium to the electrical device. An operating system for determining whether the electrical device requires power from the storage medium. In one embodiment the operating system monitors the current of the source of intermittent power and if the current exceeds a predetermined limit the operating system couples the storage medium to the electrical device by manipulating the position of a switching device disposed between the electrical storage medium and the electrical device.

20 Claims, 4 Drawing Sheets

| STATE | SWITCH POSITION | CONDITIONS THAT CHANGE SWITCH POSITION OR CONTROLLER STATE |
|---|---|---|
| FLOAT | OFF | VOLTAGE, CURRENT, TIME |
|  | ON | VOLTAGE, CURRENT, TIME |
| RECHARGE | OFF | SWITCH TO "ON" |
|  | ON | VOLTAGE, CURRENT, TIME DETERMINE SWITCH TO "FLOAT" STATE |
| DISCHARGE | OFF | SWITCH TO "ON" |
|  | ON | VOLTAGE, CURRENT, TIME DETERMINE SWITCH TO "RECHARGE" STATE |
| MANUAL | OFF | WHEN INSTALLATION OR MAINTENANCE COMPLETE, SWITCH TO "ON" |
|  | ON | WHEN INSTALLATION OR MAINTENANCE REQUIRED, SWITCH TO "OFF" |

FIG. 2

APPARATUS AND METHOD FOR PROVIDING TEMPORARY POWER

TECHNICAL FIELD

The present application relates to standby power systems. More particularly, the present application relates to a method and apparatus for charging and providing a standby power source for use in systems requiring an uninterruptible power supply.

BACKGROUND OF THE INVENTION

Standby batteries are continuously charged at a constant voltage namely, a power supply to which they are connected. This constant charging allows the batteries to be fully charged for use in the event of a power outage. Standby batteries are necessary in a device requiring an uninterruptible power source in order to provide a standby or temporary source of power to the device and/or the system they are backing up.

The standby batteries are designed to provide a source of power for a particular device or system so that the system can be provided with an uninterrupted supply of power in the event of a failure of the first or main power supply. Standby batteries are of particular importance in applications where the system the batteries are connected to is required to provide an uninterrupted service. For example, cell phone towers, computer systems, apparatus and other systems for transfer of data through a medium wherein the data stream must be continuously provided and/or supported.

In order to provide a seamless transfer of power from the main power supply to the backup power supply these batteries are directly coupled to the main power supply and the electrical load. This direct connection serves two goals 1) to maintain the batteries at a full charge and 2) providing a seamless transfer from the main power supply to the backup power supply (e.g., uninterrupted power supply). In this configuration the batteries are maintained at a full charge by a direct connection with the main power supply. Accordingly, the batteries are constantly being charged regardless of whether the batteries are fully charged and do not require charging. The battery industry refers this condition as "overcharge". When the batteries are overcharged continuously, there are side reactions that reduce the batteries' performance over time. The grids of the positive plates are corroded and the water in the electrolyte is decomposed into oxygen gas and hydrogen gas. Both of these reactions cause higher internal resistance in the battery, which reduces its performance.

Thus, as the internal resistance of the battery increases, it can no longer supply the same amount of energy at the same voltage. Since the side reactions are inevitable, the rate at which this change in resistance occurs is particularly important. This higher internal resistance is undesirable particularly in data transfer devices wherein the internal resistance is particularly important. This higher rate of resistance is undesirable particularly when the standby batteries are the sole source of power, for example, providing backup power to a system experiencing a power outage. Moreover, and in particular with regard to systems requiring an uninterrupted source of power (e.g., data transfer devices) change in internal resistance is particularly important.

SUMMARY OF THE INVENTION

A backup power supply, comprising: a storage medium for holding an electrical charge, the storage medium being adapted to be coupled to a DC bus by a switching device having an output end and an input end, the input end being coupled to a permanent power grid and the output end being configured to provide a source of power; a source of intermittent power coupled to the DC bus; and an operating system for determining whether the output end requires power from the storage medium, the operating system monitors the current of the source of intermittent power and if the current to the source of intermittent power exceeds a predetermined limit the operating system couples the storage medium to the DC bus by manipulating the position of the switching device, the operating system comprises a controller for determining which of a plurality of states the backup power supply should be in.

A backup power supply, comprising: a storage medium for holding an electrical charge being configured to be connected and disconnected from an electrical device; a source of intermittent power coupled to a power supply and the electrical device being configured to provide an amount power to the electrical device for a period of time long enough to connect the storage medium to the electrical device; and an operating system for determining whether the electrical device requires power from the storage medium. In one embodiment the operating system monitors the current of the source of intermittent power and if the current exceeds a predetermined limit the operating system couples the storage medium to the electrical device by manipulating the position of a switching device disposed between the electrical storage medium and the electrical device.

A control system for a backup power supply, comprising a control algorithm for continuously monitoring a plurality of states of the backup power supply having a plurality of capacitors, the plurality of capacitors being coupled to a power supply and an electrical load and a plurality of batteries being adapted to be coupled and uncoupled from the power supply and the electrical load, the control algorithm determining which of the plurality of states the backup power supply should be in.

A method for providing uninterrupted power, comprising: monitoring the current of a plurality of capacitors connected in series to each other and being electrically coupled to a power supply and an electrical load; connecting a storage medium to the electrical load when the current in the plurality of capacitors exceeds a predetermined value, the storage medium is adapted to provide a secondary source power in the event of a power interruption in the power supply.

The above described and other features of the present disclosure will be appreciated and understood by those skilled in the art from the following detailed description, drawings, and appended claims.

BRIEF DESCRIPTION OF THE DRAWINGS

FIG. 2 is a state table illustrating states of the controller controlling the power supply circuit of the present disclosure;

DESCRIPTION OF THE PREFERRED EMBODIMENT

A method and apparatus for providing an auxiliary source of power to an item or system requiring an independent power supply, the auxiliary source of power provides power for a limited period of time. The auxiliary source of power is provided for a period of time sufficient for another source of power to be coupled to the item when the power supply to the item is uninterrupted.

Figure 1:
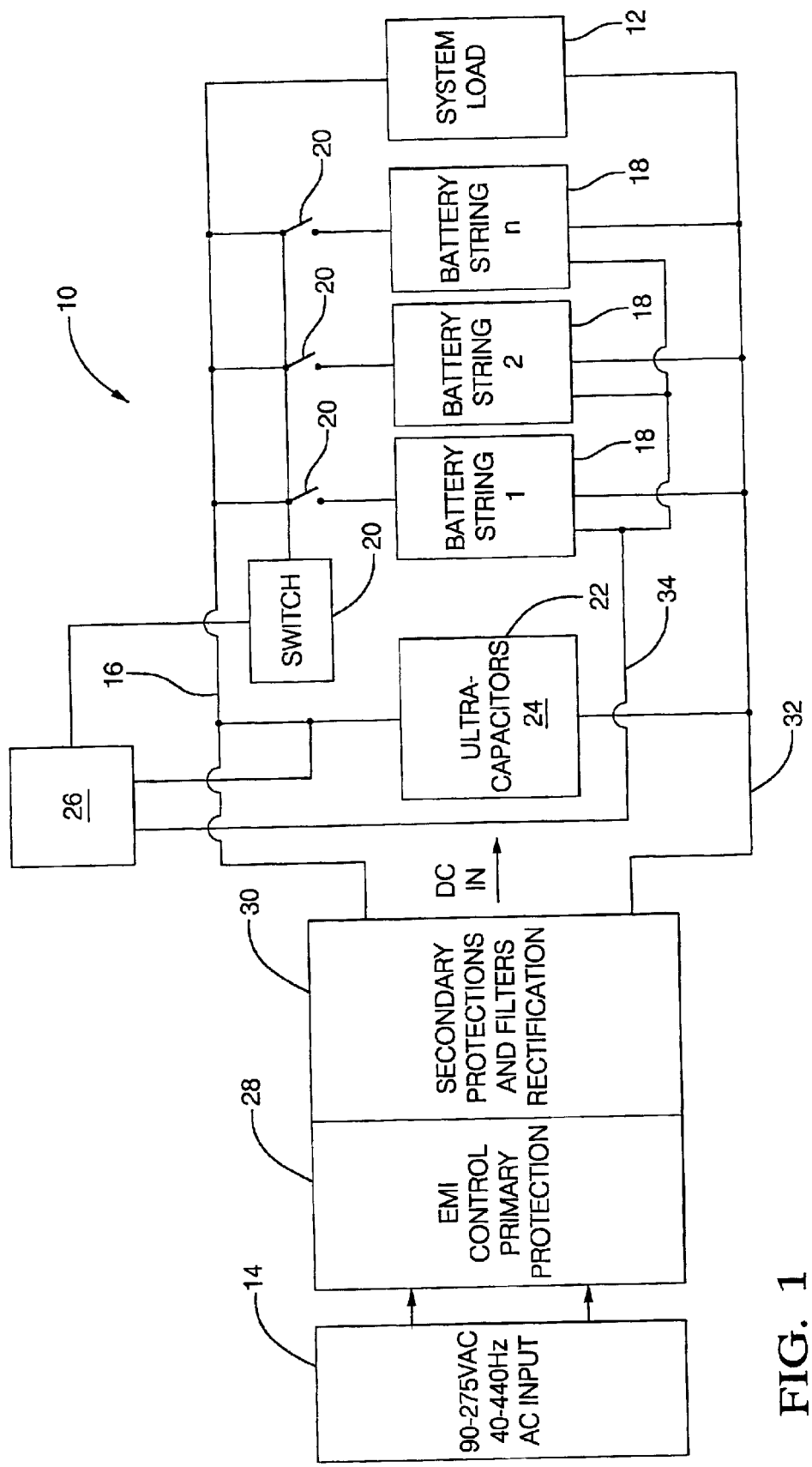
FIG. 1 is a simplified block diagram of the power supply circuit of the present disclosure.

Referring now to FIG. 1, a schematic depiction of a system or device 10 for providing a source of temporary and independent power is illustrated. System 10 provides a source of power to a system load 12 in the event of a power failure from a permanent source of power 14. Permanent source of power 14 is electrically coupled to system load 12 through the use of lines 16 or other equivalent means for coupling a power supply to a load.

In accordance with an exemplary embodiment of the present disclosure, a plurality of batteries 18 are connected in parallel with load 12. The batteries are connected through the use of at least one switching device 20 for connecting batteries 18 to load 12. As an alternative, each battery has its own switching device to connect it to load 12.

Accordingly, batteries 18 are capable of providing a source of power to load 12 in the event of a failure or interruption of service to permanent source of power 14. In an exemplary embodiment batteries 18 are lead acid batteries. Of course, other alternatives are contemplated in accordance with the present application, for example, nickel metal hydride (NiMH) batteries are but one example of an alternative battery. A criterion for batteries 18 would be long life, ability to withstand temperature variations and multiple discharges and recharges.

Switching device 20 also provides a means for connecting batteries 18 to permanent source of power 14 (e.g., a power grid) to charge batteries 18, as necessary. In one embodiment switching device 20 is a solid-state switch or relay. Alternatively, switching device 20 could be a mechanical switch. Power grid 14 also provides a permanent source of power for load 12.

In addition to batteries 18, a plurality, or at least one source of intermittent power 22, is also connected to load 12. Source of intermittent power 12 is directly coupled to permanent source of power 14 as well as load 12. Source of intermittent power 22 is positioned to provide power to load 12 so as to enable a seamless or non-interrupted transition from power supply 14 to batteries 18.

In an exemplary embodiment source of intermittent power 22 is a plurality of capacitors 24 capable of supplying a source of power to system load 12 for a period long enough to allow for batteries 18 to be coupled to load 12 through the use of switching device or switches 20 wherein there will be no loss or interruption of power to load 12. Accordingly, capacitors 24 provide a source of temporary power long enough to allow batteries 18 to be electrically coupled to the load without causing an interruption of the power to load 12.

Capacitors 24 are in an exemplary embodiment connected in series with each other and are connected in parallel with batteries 18. Capacitors 24 are directly connected to permanent source of power 14 as well as load 12.

Accordingly, capacitors 24 are constantly receiving a voltage or charging current from power supply 14 while batteries 18 are capable of being disconnected from power supply 14 so as to avoid the deleterious effects on batteries due to constant charging.

A controller or control system 26 is configured to monitor the current flow of capacitors 24 as well as operate switches 20 in order to connect batteries 18 to load 12.

Block 14 represents a source of AC power, which for many user applications will be 117 volt 60 Hertz AC power from a residential power grid which is standard in the United States. The preferred embodiment, however, is adapted for receiving input voltages from 90 to 275 volts and at frequencies from 40 to 440 Hertz, to accommodate power grids in essentially all countries. The input power passes through a primary protection and EMI control section 28 to reduce power spikes and noise.

The power then passes through block 30 where additional protection and rectification (AC to DC) is provided. Thus, a DC voltage is provided between output lines 16 and 32. If necessary, a DC to AC converter is positioned between batteries 18 and load 12.

Under normal conditions, that is, when the power grid is working, it is important to keep the batteries 18 fully charged, but not overcharged. This generally requires a closely regulated voltage which is monitored by controller 26 via lines 34. The float, or fully charged voltage of lead acid batteries is then known by the controller and in order to maintain the charge controller 26 can periodically cause switched 20 is close in order to provide a charging.

In accordance with an exemplary embodiment charging of batteries 18 is time based in that the batteries are provided with a charging voltage periodically based upon time. Thus, no voltage monitoring is required. The self discharge rate of a battery is approximately equal to a discharge current that would be half of the battery's stored energy in 6–12 months. A reference for this value is in Berndt D., *Maintenance-Free Batteries, Second Edition*, Wiley & Sons, New York, 1997, pgs. 118–120. This corresponds to a stored energy loss rate of less than ⅓% per day. Therefore, one could charge the batteries for less than 1 hour each day and recover the losses that are due to self-discharge.

Thus, there is no need to monitor the voltage of the batteries as they can be maintained at a full charge based upon an intermittent charging subroutine that is time based.

As an alternative the voltage of batteries 18 may be monitored by monitoring the temperature of the same, as it is known that battery voltage varies with temperature. For example, as temperature increases, the charge voltage decreases. If a constant supply voltage is applied to a battery, the charging current will increase as temperature rises. In a sealed lead acid battery, it is important to prevent overcharging because of its limited capacity to recombine oxygen and hydrogen which are produced by excess current. Thus, and as discussed above, it is desirable to avoid this situation, as it is the source of increasing the rate of discharge of the battery.

As yet another alternative, the voltage of the batteries is directly monitored by the controller and when the voltage falls below a predetermined level the batteries are coupled to the power grid. In yet another alternative a combination of time, voltage and temperature is monitored to determine whether the batteries require charging.

If the "unusual" condition of power grid failure occurs, then power is supplied to load 14 by batteries 18. In order to ensure that there is no loss of power during the time period required to close switches 20 and in order to meet the demands of load 12 without interruption of power, capacitors 24 provide a source of intermittent power during the transition period from power source 14 to backup power supply 18. Accordingly, and by providing this intermittent source of power, the system is capable of disconnecting the backup power supply from a continuous charging voltage so as to prevent the deleterious affects of continuous charging. Thus, should there be a power failure while the batteries are disconnected from the charging voltage, the intermittent source of power will provide a transitional power source for the period of time necessary to connect the standby power by closing switches 20.

Providing standby power is particularly important in more rural areas where power failures are more frequent and of short duration.

As will be discussed herein, a controller monitors the system and in accordance with a control algorithm determines what state the system is in, each state, of course, corresponding to a different mode of operation of the system, for example, discharge, recharge and float.

Capacitors 24 will provide a DC voltage on the line all the time during the delay period when the batteries are hooked up or tied into the system. Accordingly, there will be no lag or loss of power between power off (interruption of power supply 14) and tying in of the backup power supply (batteries 18).

The batteries will, of course, discharge during the power outage. Upon restoration of power from the power grid, the batteries will begin recharging. Depending on the state of discharge, the batteries could draw significant currents, especially if the input source is a high voltage source.

In accordance with an exemplary embodiment temporary source of intermittent power 22 is a plurality of ultra or super capacitors connected in series to provide or withstand a drain of 100 amps for 1–5 seconds. This being a period of time sufficient enough for coupling batteries 18 to the load. Of course, and as applications require, the time period may vary and accordingly, the number of capacitors sufficient to provide an intermittent source of power for that prescribed time period will also vary. In addition, the super capacitors are capable of providing more or less amperes in a greater or lesser time.

An example of the super capacitor used in accordance with the present disclosure is available from Maxwell technologies.

For example, and in an application wherein approximately 50–54 volts are required for load 12, source of intermittent power 22 consists of 25 super capacitors capable of providing approximately 2 volts each. An example of such a load is a back-up power supply for a cellular phone tower wherein data is being transferred via a wireless network requiring an uninterrupted source of power. In particular and in the case of a wireless network being utilized to provide data transfer, the uninterrupted source of power is required to allow seamless data transfer which is particularly important in application wherein a break of the data stream would cause a critical or fatal error to occur. An example of such a data transfer is banking transactions (e.g., money transfers), stock purchase requests, data encryption, etc.

Other uninterruptible power systems (UPS) require larger or smaller voltages, for example 50–120 volts are required for money transfers, data transfers and main frames and 12–24 volts are required for emergency lighting. Of course, and as applications may require, it is contemplated that the backup power supply and control system of the present application is adaptable to provide a source of temporary power having voltages greater and less than those previously mentioned.

Figure 3:
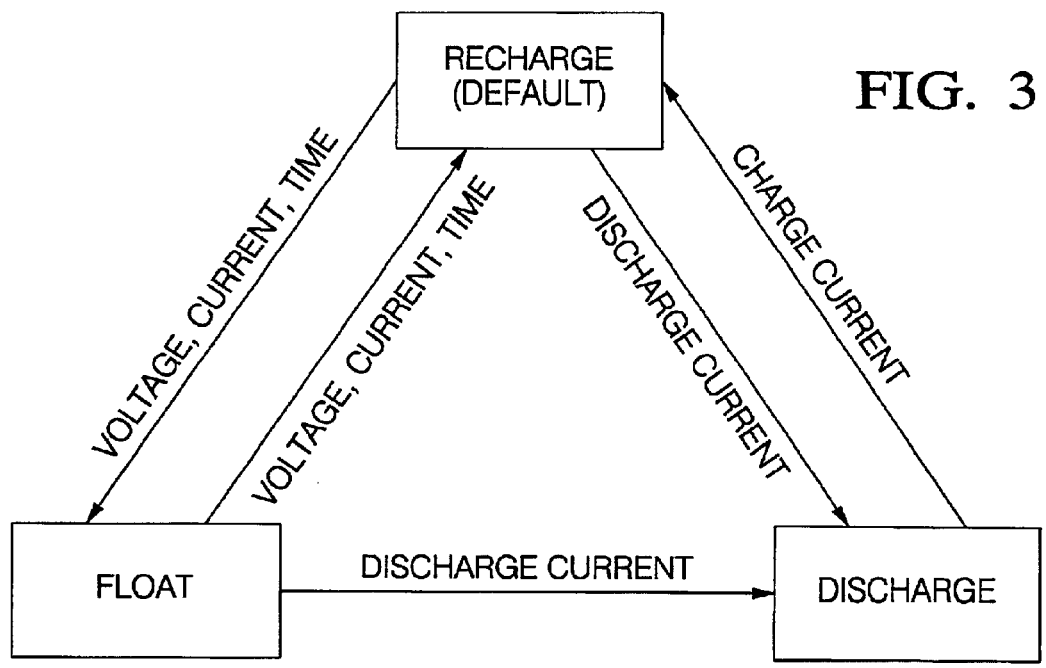
FIG. 3 is a block diagram illustrating a possible flow of logic used by the controller of the present disclosure.
Figure 4:
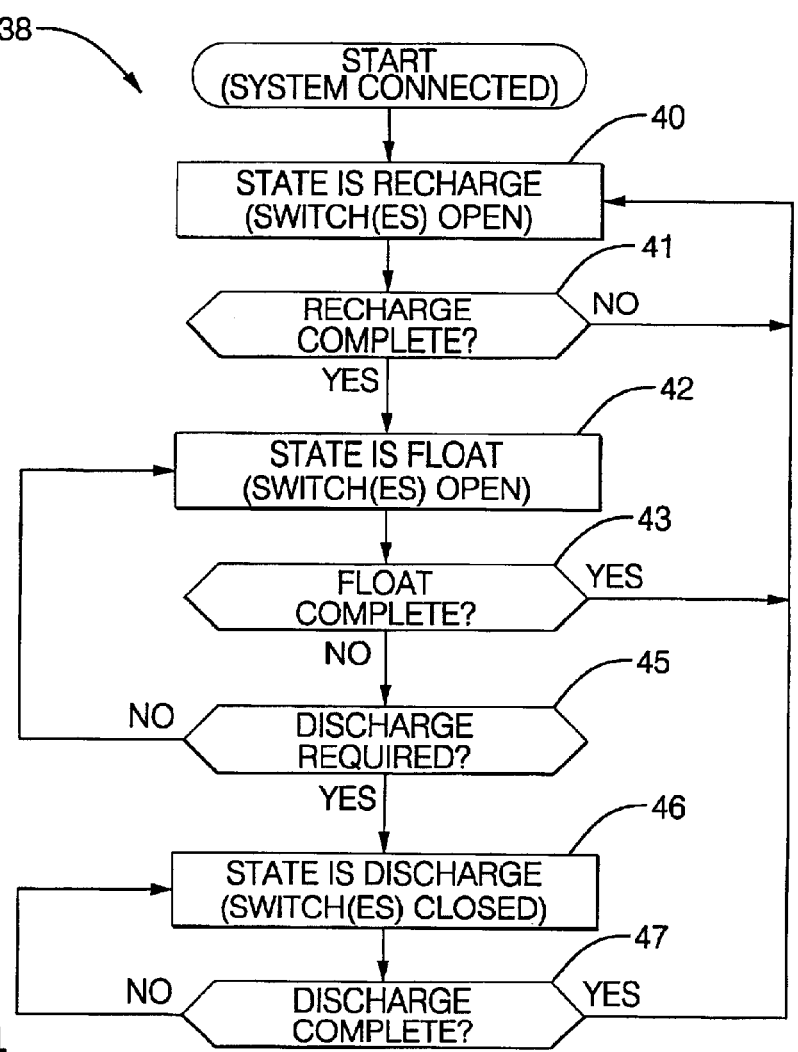
FIG. 4 is a flow chart illustrating portions of a control algorithm for use with the present disclosure and FIG. 5 is a flow chart illustrating portions of a control algorithm for use with the present application.
Figure 5:
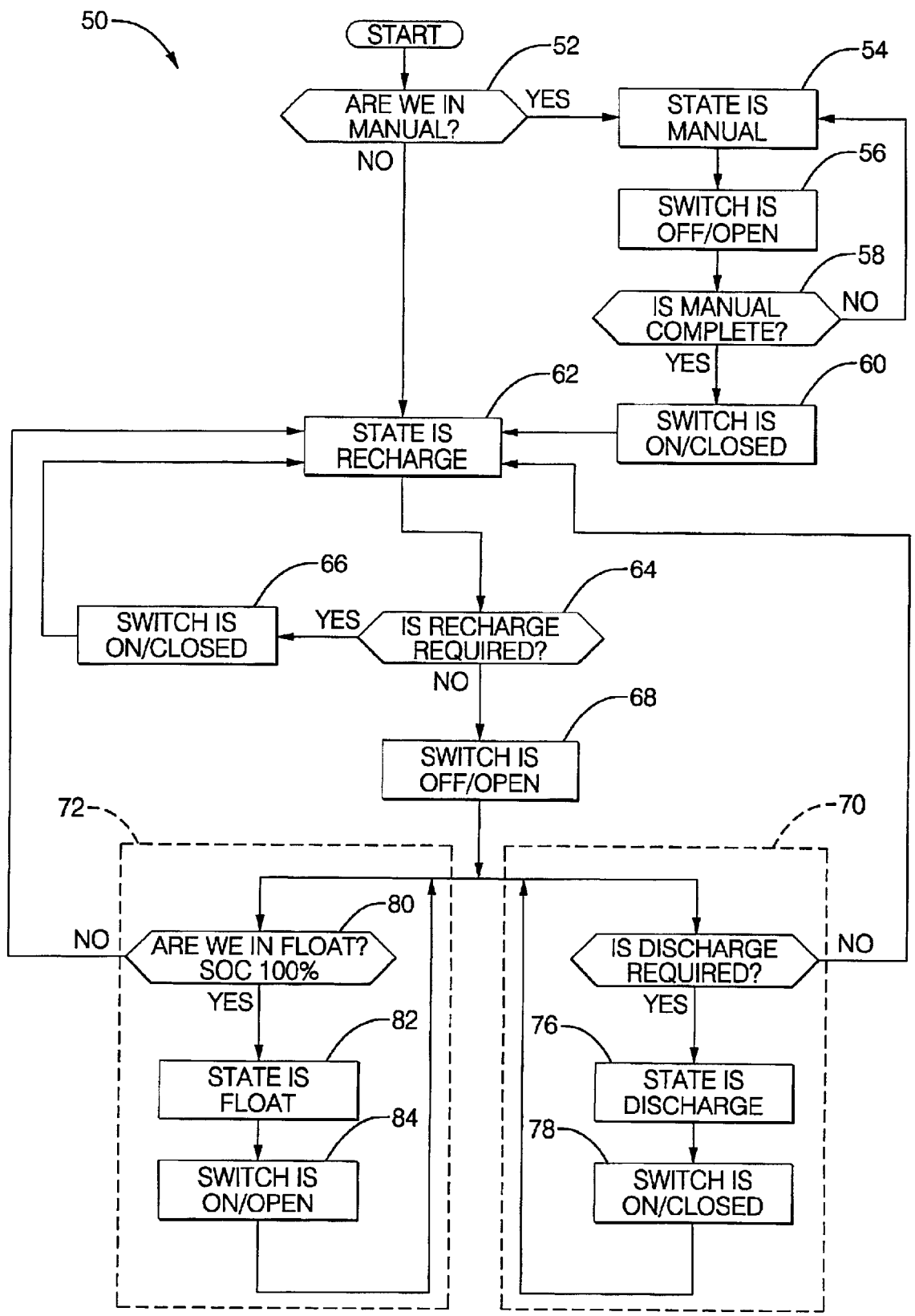

Referring now to FIGS. 2–4, operational aspects of the present disclosure are now described. FIG. 2 illustrates a state table 36 wherein each of four states of the control system of the present disclosure is illustrated. Each mode of the battery system becomes a state for the controller. In each state, the switch can be either on or off. In the "on" position, batteries are connected to the DC bus via switches 20. State table 36 illustrates conditions that will change the switch position or controller state for each state.

FIG. 4 illustrates a flowchart 38 representing a possible control algorithm used by controller 26 in order to operate system 10. Flowchart 38 is provided as an example of a possible control algorithm and other configurations and/or control algorithms are contemplated in accordance with the present disclosure.

Box 40 represents the recharge state wherein the switches are closed. When the system is in the recharge state a decision node 41 determines whether a recharge is required. Accordingly, the batteries will be recharged by being directly coupled to the power grid. The recharge condition or state monitors the voltage, current and time in order to determine whether or not to switch to the float state. If the recharge is complete the system is in the float state represented by box 42. Decision node 43 determines whether the float state is complete if so, the system returns to the recharge state represented by box 40. Alternatively, if the float is not complete, a decision node 45 determines whether a discharge is required. If so, the system state is discharge represented by box 46. Decision node 47 determines whether the discharge is complete. If, on the other hand a discharge is not required the system returns back to the float state represented by box 42.

Referring now to FIG. 4 a flowchart 50 represents another possible control algorithm used by controller 26 in order to operate system 10. Flowchart 50 is provided as an example of a possible control algorithm and other configurations and/or control algorithms are contemplated in accordance with the present disclosure. For example, the positioning of the manual state can be relocated to any other position within the control algorithm. An example of the type of software capable of executing the control algorithm is "C programming" or equivalents thereof.

Control algorithm 50 has a decision node 52 which determines whether the battery system is in a manual state mode. If so, the state is manual as represented by box 54 and the default switch position is open or off as represented by box 54. State table 36 illustrates conditions that change the switch position or controller state representative to the manual state. When the system is in the manual state a decision node 58 determines whether the manual mode is complete. For example, when installation or maintenance to the system is complete the switch is switched to the on or closed position represented by box 60 and the system is now in a recharge state represented by box 62.

Manual mode is essentially an interruption of the control loop for maintenance and/or installation/disassembly. The switches would be open for these events. Alternatively, and in systems where there are multiple battery strings manual mode can be configured to only open the switch on the battery string that was actually being serviced at the time.

The recharge state is the default position of the control algorithm for system 10. Accordingly, the recharge state is the default condition in the absence of a discharge current or an indication that the batteries were at or near 100 percent state of charge or other value deemed to represent the float state (e.g., 90 percent state of charge, 80 percent state of charge, etc.). When the system is in the recharge state a decision node 64 determines whether a recharge is required. If a recharge is required, the switch positioning is on or closed as represented by box 66 and the system remains in a recharge state represented by box 62. Accordingly, the batteries will be recharged by being directly coupled to the power grid. The recharge condition or state monitors the voltage, current and time in order to determine whether or not to switch to the float state.

If a recharge is not required, the switch is placed in an off or open position represented by box 68. In this configuration, two separate subroutines 70 and 72 are simultaneously run. Subroutines 70 and 72 correspond to a discharge state and a float state, respectively.

Subroutine 70 determines whether the system should be configured for discharge (e.g., connection of the batteries to the load so as to provide a temporary source of power). In actuality since the recharge is the default date, discharge will also always be running as the system is in essence continuously monitoring the current of the capacitor in order to determine whether a power failure to stores 14 has occurred. In order to determine whether a discharge is required the controller will monitor voltage, current and time (since last charge or recharge). In accordance with an exemplary embodiment, controller 26 monitors the current at a positioned proximate to the capacitors. During normal operations wherein there is no interruption of power capacitors 24 will require a small charging current.

In the event of a power failure (interruption of power supply 14) the current in close proximity to capacitors 24 will reverse in direction and will increase dramatically. Accordingly, controller 26 will monitor this point for such a disturbance or variation in the current flow. For example, during charging the current will be very small on the order of milli-amperes wherein a discharge will be in amperes thus, the system will not require complex logic in order to determine whether the capacitors are in a discharge event.

Once such an occurrence is detected the controller will immediately instruct the switching device or switches to close thereby connecting batteries 18 to system load 12.

Accordingly, and in order to prevent an interruption in the power supply to load 12 capacitors 24 only need to supply an intermittent amount of voltage for a period of time sufficient enough to allow controller 26 to determine that they are indeed has been a power failure and instruct switches 20 to close. In accordance with an exemplary embodiment of the present disclosure this period of time is very small for example, on the order of seconds or fractions thereof.

The discharge state determines at decision node 74 whether a discharge is required as described above. If so, the system is in a discharge state. This is represented by box 76 and the switch is in an on or closed position represented by box 78. Alternatively, if a discharge is not required, the system returns back to its default recharge state represented by box 62.

After a discharge event occurs and when the DC bus comes back up (e.g., return of the power grid) the batteries and the capacitors are recharged.

Subroutine 72 determines whether the system is in a float state (e.g., a 100 percent state of charge) this is determined by decision node 80. In accordance with the present application, the value for determining whether the system is in a float state or not can vary for example, 90 percent state of charge, 75 percent of charge or 50 percent state of charge may be used to determine whether or not the system is in a float state. Of course, other percentages and/or limits may be used to determine whether or not the system is in a float state.

An example of another type of limit for defining whether the system used at a float state can be time based wherein the controller records the period of time between the last recharge and/or the last discharge. For example, the controller can be configured to operate a subroutine wherein the batteries are coupled to the power supply for 15 minutes every 36 hours or other configurations based upon the size of the batteries and the amount of charging current available.

As yet another alternative means for determining whether the system used in a state of "float", the controller can directly monitor the voltage of the batteries. Therefore, and if the battery voltages fall below a predetermined value, the system can be configured to provide a recharge or be instructed to be positioned into the recharge state.

If the system is at a 100 percent state of charge or at another condition defined as corresponding to a float state (e.g., batteries at full charge), the state is float and the switch position is in the off or open position, this is represented by boxes 82 and 84. In this state the system has been determined to be in a state not require charging, thus the switch position is open.

If, on the other hand, the system is not in a float state (e.g., less than 100 percent state of charge or other value defined as the limit for the system being in a float state), the system refers back to its default recharge state wherein the batteries are connected to a recharging power supply (e.g., the power grid).

Using the float mode to recharge the batteries and in particular wherein the float mode is based upon a time based recharging system damage to the batteries is prevented as in the recharging voltage is not placed upon the batteries for an extended period of time.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A backup power supply for an electrical device, comprising:

a storage medium for holding an electrical charge being configured to be connected and disconnected from the electrical device;

a source of intermittent power coupled to a power supply and the electrical device, said source of intermittent power being configured to provide an amount power to the electrical device for a period of time long enough to connect said storage medium to the electrical device;

an operating system for determining whether the electrical device requires power from said storage medium, said operating system comprises a controller employing a control algorithm for determining whether the backup power supply is in one of a plurality of states; said plurality of states comprises a discharge state, a float state and a recharge state; and wherein said operating system monitors the current of said source of intermittent power and if said current of said source of intermittent power supply exceeds a predetermined limit said operating system couples said storage medium to said electrical device and the backup power supply is in said discharge state, wherein said source of intermittent power is a plurality of capacitors connected to each other in series.

2. The backup power supply as in claim 1, wherein said operating system monitors the current of said source of intermittent power and if said current of said source of intermittent power exceeds a predetermined limit said operating system couples said storage medium to said electrical device by manipulating the position of a switching device disposed between said electrical storage medium and said electrical device.

3. The backup power supply as in claim 2, wherein said switching device is either a mechanical or electronic switching device.

4. The backup power supply as in claim 1, wherein said plurality of capacitors are capable of providing at least 100 amps for a period of 1–5 seconds.

5. The backup power supply as in claim 4, wherein said electrical device requires up 12–54 volts.

6. The backup power supply as in claim 1, wherein said float state corresponds to said storage medium being at a sufficient charge level wherein said storage medium is electrically uncoupled from said power supply and said electrical device.

7. The backup power supply as in claim 6, wherein said discharge state corresponds to an interruption to said power supply wherein said storage medium is electrically coupled to said electrical device.

8. A backup power supply for an electrical device, comprising:
a storage medium for holding an electrical charge being configured to be connected and disconnected from the electrical device;
a source of intermittent power coupled to a power supply and the electrical device, said source of intermittent power being configured to provide an amount power to the electrical device for a period of time long enough to connect said storage medium to the electrical device;
an operating system for determining whether the electrical device requires power from said storage medium, said operating system comprises a controller employing a control algorithm for determining whether the backup power supply is in one of a plurality of states; said plurality of states comprises a discharge state, a float state and a recharge state; and
wherein said operating system monitors the current of said source of intermittent power and if said current of said source of intermittent power supply exceeds a predetermined limit said operating system couples said storage medium to said electrical device and the backup power supply is in said discharge state, wherein said float state corresponds to an acceptable state of charge of said electrical storage medium and said recharge state corresponds to an unacceptable state of charge of said electrical storage medium.

9. The backup power supply as in claim 8, wherein said electrical storage medium is a plurality of lead-acid batteries coupled to said switching device.

10. The backup power supply as in claim 8, wherein said recharge state is the default state of said operating system.

11. The backup power supply as in claim 8, wherein said control algorithm continuously monitors said plurality of states of said backup power supply and said control algorithm determines which of said plurality of states said backup power supply should be in.

12. The backup power supply as in claim 8, wherein said source of intermittent power is a plurality of capacitors and said discharge state is determined by monitoring the current in said plurality of capacitors.

13. The backup power supply as in claim 12, wherein said recharge state is determined by the amount of time elapsed since said electric storage medium is electrically coupled to said power supply.

14. The backup power supply as in claim 8, wherein said recharge state corresponds to said storage medium being below a sufficient charge level wherein said storage medium is electrically coupled to said power supply.

15. A backup power supply for use with a permanent power grid, comprising:
a storage medium for holding an electrical charge, said storage medium being coupled to a DC bus by a switching device, said DC bus having an output end and an input end, said input end being coupled to the permanent power grid and said output end being configured to provide a source of power;
a source of intermittent power comprising a plurality of capacitors connected to each other in series, said source of intermittent power being coupled to said DC bus; and
an operating system for determining whether said output end requires power from said storage medium, said operating system monitors the current of said source of intermittent power and if said current of said source of intermittent power exceeds a predetermined limit said operating system couples said storage medium to said DC bus by manipulating the position of said switching device, said operating system comprises a controller for determining which of a plurality of states said backup power supply should be in.

16. The backup power supply as in claim 15, wherein said plurality of states includes a discharge state, a float state and a recharge state, and a manual state and said recharge state is the default state of said backup power supply.

17. The backup power supply as in claim 16, wherein said float state is only reached after said recharge state has been reached.

18. The backup power supply as in claim 16, wherein said controller simultaneously determines whether said backup power supply should be in said float state and whether said backup power supply should be in said discharge state.

19. A backup power supply for use with a permanent power grid, comprising:
a storage medium for holding an electrical charge, said storage medium being coupled to a DC bus by a switching device, said DC bus having an output end and an input end, said input end being coupled to the permanent power grid and said output end being configured to provide a source of power;
a source of intermittent power coupled to said DC bus; and
an operating system for determining whether said output end requires power from said storage medium, said operating system monitors the current of said source of intermittent power and if said current of said source of intermittent power exceeds a predetermined limit said operating system couples said storage medium to said DC bus by manipulating the position of said switching device, said operating system comprises a controller for determining which of a plurality of states said backup power supply should be in, said plurality of states comprising a discharge state, a float state and a recharge state, wherein said recharge state is the default state of said backup power supply.

20. A backup power supply for use with a permanent power grid, comprising:

a storage medium for holding an electrical charge, said storage medium being coupled to a DC bus by a switching device, said DC bus having an output end and an input end, said input end being coupled to the permanent power grid and said output end being configured to provide a source of power;

a source of intermittent power coupled to said DC bus; and an operating system for determining whether said output end requires power from said storage medium, said operating system monitors the current of said source of intermittent power and if said current of said source of intermittent power exceeds a predetermined limit said operating system couples said storage medium to said DC bus by manipulating the position of said switching device, said operating system comprises a controller for determining which of a plurality of states said backup power supply should be in, wherein said plurality of states comprises a discharge state, a float state and a recharge state, and a manual state and said recharge state is the default state of said backup power supply.

* * * * *